(12) United States Patent
Zhan et al.

(10) Patent No.: US 11,644,118 B2
(45) Date of Patent: May 9, 2023

(54) ELECTRONIC EXPANSION VALVE

(71) Applicant: ZHEJIANG DUNAN ARTIFICIAL ENVIRONMENT CO., LTD., Shaoxing (CN)

(72) Inventors: Shaojun Zhan, Shaoxing (CN); Yukuan Shan, Shaoxing (CN); Qianyong Zhan, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 222 days.

(21) Appl. No.: 16/972,852

(22) PCT Filed: Aug. 21, 2019

(86) PCT No.: PCT/CN2019/101670
§ 371 (c)(1),
(2) Date: Dec. 7, 2020

(87) PCT Pub. No.: WO2020/038380
PCT Pub. Date: Feb. 27, 2020

(65) Prior Publication Data
US 2021/0190398 A1 Jun. 24, 2021

(30) Foreign Application Priority Data
Aug. 21, 2018 (CN) .......................... 201821359288.1

(51) Int. Cl.
*F16K 31/04* (2006.01)
*F25B 41/35* (2021.01)
(Continued)

(52) U.S. Cl.
CPC ................ *F16K 31/04* (2013.01); *F16K 1/36* (2013.01); *F16K 1/42* (2013.01); *F16K 1/54* (2013.01);
(Continued)

(58) Field of Classification Search
CPC ...... F16K 31/04; F16K 31/50; F16K 31/0655; F16K 1/36; F16K 1/42; F16K 1/54;
(Continued)

(56) References Cited

U.S. PATENT DOCUMENTS 9,383,027 B2 * 7/2016 Lv ........................ F16K 37/0058
9,689,595 B2 * 6/2017 Zhan ....................... F25B 41/38
(Continued)

FOREIGN PATENT DOCUMENTS

CN 108343749 A 7/2018
CN 207584048 U 7/2018
(Continued)

OTHER PUBLICATIONS

International Search Report of PCT/CN2019/101670.
(Continued)

*Primary Examiner* — Patrick C Williams (57) ABSTRACT

An electronic expansion valve, comprising a valve seat assembly and a valve core assembly. The valve core assembly is disposed in the valve seat assembly. The valve seat assembly comprises a valve seat, a valve seat core, and a guide sleeve. The valve seat is provided with a valve cavity, one end of which is open. A through hole is provided on the valve seat core; the end of the conduction portion close to the guide sleeve is circumferentially provided with an inclined surface inclined outwards. The valve core assembly comprises a valve head. The end of the valve head close to the valve seat core is provided with a sealing surface. The valve head is driven to move close to or away from the valve seat core, so as to adjust the gap between the inclined surface and the sealing surface.

11 Claims, 6 Drawing Sheets

(51) Int. Cl.
*F16K 1/36* (2006.01)
*F16K 1/42* (2006.01)
*F16K 1/54* (2006.01)
*F16K 39/02* (2006.01)
*F16K 31/50* (2006.01)
*F25B 41/31* (2021.01)

(52) U.S. Cl.
CPC ............ *F16K 31/50* (2013.01); *F16K 39/022* (2013.01); *F25B 41/31* (2021.01); *F25B 41/35* (2021.01)

(58) Field of Classification Search
CPC ........ F16K 39/022; F25B 41/35; F25B 41/31; Y02B 30/70
See application file for complete search history.

(56) References Cited

U.S. PATENT DOCUMENTS

| | | | |
|---|---|---|---|
| 2011/0012038 | A1 | 1/2011 | Lv et al. |
| 2015/0184768 | A1* | 7/2015 | Zhan ..................... F25B 41/35 251/65 |

FOREIGN PATENT DOCUMENTS

| | | |
|---|---|---|
| CN | 209180369 U | 7/2019 |
| JP | H9292047 A | 11/1997 |
| JP | 3195271 U | 1/2015 |
| KR | 20170126673 A | 11/2017 |

OTHER PUBLICATIONS

The extended European search report of 19852802.8.
The partial supplementary European search report of 19852802.8.
European Office Action of 19852802.8.

* cited by examiner

ELECTRONIC EXPANSION VALVE

CROSS-REFERENCE TO RELATED APPLICATIONS

This application is a 371 of international PCT patent application PCT/CN2019/101670 filed on Aug. 21, 2019, which claims all benefits accruing under 35 U.S.C. § 119 from China Patent Application No. 201821359288.1 and titled "ELECTRONIC EXPANSION VALVE", filed on Aug. 21, 2018, in the China National Intellectual Property Administration, the content of which is hereby incorporated by reference.

TECHNICAL FIELD

The present disclosure relates to the field of air conditioning refrigeration equipment, in particular to an electronic expansion valve.

BACKGROUND

An electronic expansion valve is an important part of an air conditioning refrigeration system. The valve is used to throttle and depressurize a high-pressure liquid refrigerant, and adjust and control a flow rate of the liquid refrigerant. A flow regulating surface of a valve head part and a diameter of a valve seat core determine the flow adjustment of the general electronic expansion valve. Therefore, in order to meet the requirements of producing products with different flow rate, valve head parts and valve seat cores with different size are needed to design, resulting in poor versatility, high production costs, and low production and assembling efficiency.

SUMMARY

In order to solve the above technical problems, it is necessary to provide an electronic expansion valve, which is simple in structure, convenient to assemble, low cost, a high assembling efficiency, and a broad application prospect. The electronic expansion valve has a valve head, which has good versatility and is configured to match with valve seat cores of different sizes, so as to control the flow rate.

An electronic expansion valve includes a valve seat assembly and a valve core assembly disposed in the valve seat assembly.

The valve seat assembly includes a valve seat, a valve seat core, and a guide sleeve. The valve seat is provided with a valve chamber having an opening at a first end, the valve seat core is disposed on a second end of the valve seat, and the guide sleeve is disposed on the valve seat.

The valve seat core is provided with a through hole. A sidewall of the through hole near the guide sleeve is circumferentially provided with an inclined surface inclined outwards and configured for controlling a flow rate of a refrigerant.

The valve core assembly includes a valve head, which is disposed in the guide sleeve, and is capable of sliding. One end of the valve head matching with the valve seat core is provided with a sealing surface. The valve head is driven to move close to or away from the valve seat core, so as to adjust a gap between the inclined surface and the sealing surface and control the flow rate of the refrigerant.

In some embodiments, an end of the through hole near the guide sleeve is provided with a guiding opening. A diameter of the guiding opening gradually increases along a direction from the valve seat core to the guide sleeve, so that the inclined surface inclined outwards is defined on an inner wall of the guiding opening.

In some embodiments, the guiding opening has an open angle $\alpha$, and the through hole has a diameter A, and the diameter A increases as the open angle $\alpha$ increases.

In some embodiments, a protrusion portion is formed at one end of the valve seat core near the guide sleeve. The valve seat is provided with a mounting hole communicating with the valve chamber. The other end of the valve seat core penetrates through the mounting hole, resulting in the protrusion portion abutting against the valve seat.

In some embodiments, the valve core assembly further includes a ball screw and a spring. The valve head is provided with a connecting hole, and a first end of the ball screw is arranged in the connecting hole. The spring sleeves on the ball screw, a first end of the spring abuts against the ball screw, and a second end of the spring is located in the connecting hole.

In some embodiments, an inner surface of a connecting hole has a flange protruding inward, and the ball screw is provided with a gasket. The first end of the spring abuts against the gasket, and the second end of the spring abuts against the flange.

In some embodiments, the valve core assembly further includes a limiting sleeve located in the connecting hole and matched with the flange to limit the valve seat core. The first end of the ball screw penetrates through the flange and is connected with the limiting sleeve.

In some embodiments, the gasket and the spring are located at one side of the flange, and the limiting sleeve is located at the other side of the flange. An outer diameter of the limiting sleeve is larger than that of the flange.

In some embodiments, the valve core assembly further includes a sealing ring, which is sleeved on an outer surface of the valve head, and is configured for sealing a slot between the outer surface of the valve head and the inner surface of the guide sleeve.

In some embodiments, the electronic expansion valve further includes a nut assembly and a rotor; the nut assembly is disposed at the first end of the valve seat away from the valve seat core; and a second end of the ball screw away from the valve seat core penetrates from and screws to the nut assembly, and is connected to the rotor.

The nut assembly includes a nut seat and a fixing plate. The fixing plate is in a ring shape. An inner surface of the fixing plate contacts the nut seat, resulting in a connection between the fixing plate and the nut seat. The outer surface of the fixing plate contacts one end of the guide sleeve, resulting in the fixing plate being connected with the end of the guide sleeve.

The electronic expansion valve can further include a sleeve tube, and one end of the sleeve tube can be connected with the guide sleeve, and the sleeve tube is configured for accommodating the nut assembly and the rotor.

The advantages of the electronic expansion valve in the present disclosure include the following.

In the electronic expansion valve, the valve seat core has an inclined surface, i.e., the valve seat core has both the through hole and the inclined surface together. When applied in different conditions, as long as the valve seat core is changed, a slot between the sealing surface of the valve head and the inclined surface of the valve seat core can be controlled and the flow curve adjusted. The electronic expansion valve not only has good universality and low producing and processing cost, but also has a promising application prospect. In addition, the valve head and the guide sleeve are independent, i.e., they are separated from each other, improving the universality of the valve core assembly. The valve core assembly can be recycled independently, which further reduces the producing cost.

The explanatory texts in the figures are shown hereinafter: 100 represents an electronic expansion valve, 10 represents a valve seat assembly, 11 represents a valve seat, 11a represents a valve chamber, 111 represents a mounting hole, 12 represents a valve seat core, 121 represents a through hole, 121a represents an inclined surface, 122 represents a protrusion portion, 123 represents a guiding opening, 13 represents a guide sleeve, 14 represents a first channel, 15 represents a second channel, 20 represents a valve core assembly, 21 represents a valve head, 21a represents a sealing surface, 22 represents a sealing ring, 23 represents a ball screw, 24 represents a gasket, 25 represents a spring, 26 represents a limiting sleeve, 27 represents a flange, 30 represents a nut assembly, 31 represents a nut seat, 32 represents a fixing plate, 40 represents a rotor, 50 represents a sleeve tube.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in this application, all other embodiments obtained by those of ordinary skill in the art without creative work are within the scope of protection of this application.

It should be noted that when a component is referred to as being "arranged on" another component, it can be directly on the other component or a central component may also exist. When a component is considered to be "disposed on" another component, it can be directly installed on another component or a centered component may exist at the same time. When a component is considered to be "fixed" to another component, it can be directly fixed to the other component or there may be a centered component at the same time.

Unless otherwise defined, all technical and scientific terms used herein have the same meaning as commonly understood by one of ordinary skill in the art of this application. The terminology used in the specification of the application herein is only for the purpose of describing specific embodiments, and is not intended to limit the application. The term "or/and" as used herein includes any and all combinations of one or more related listed items.

Figure 1:
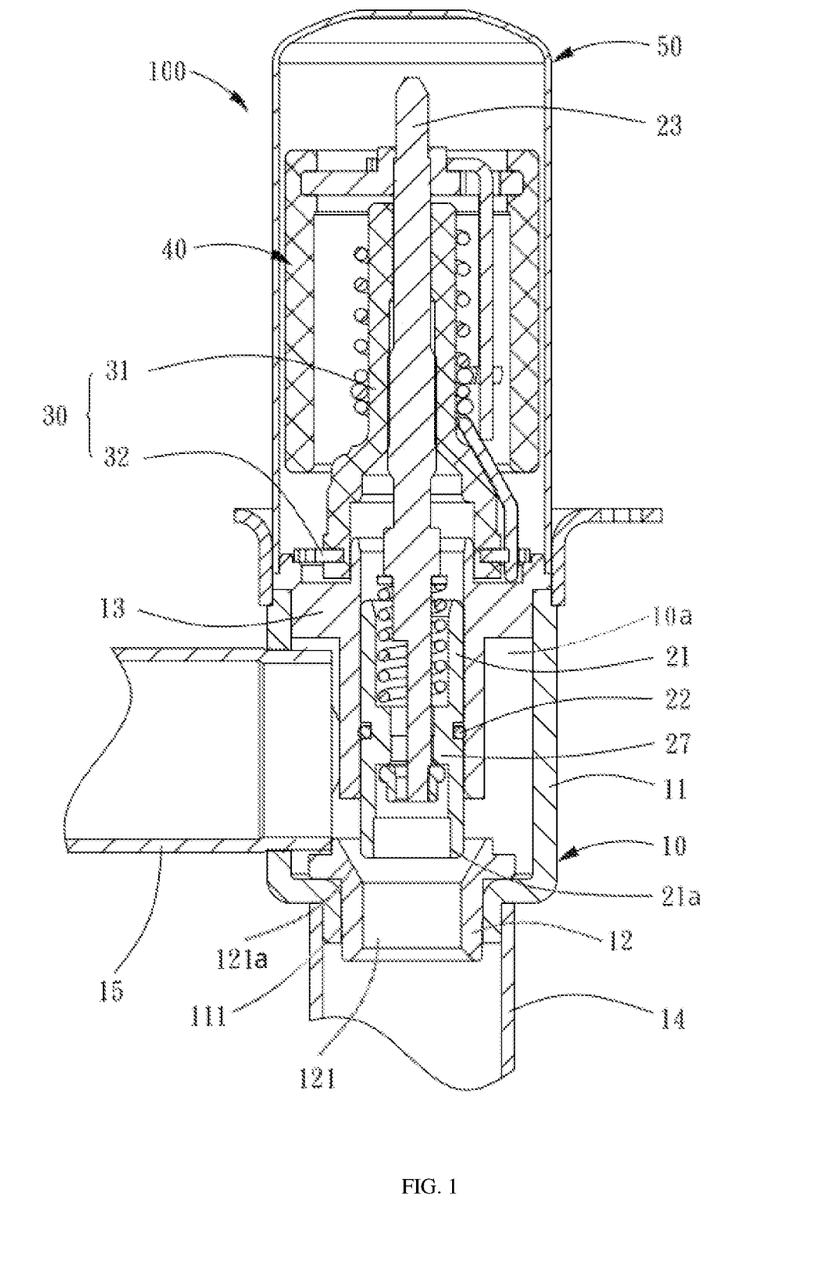
FIG. 1 is a cross-section view of an electronic expansion valve of the present disclosure.
Figure 2:
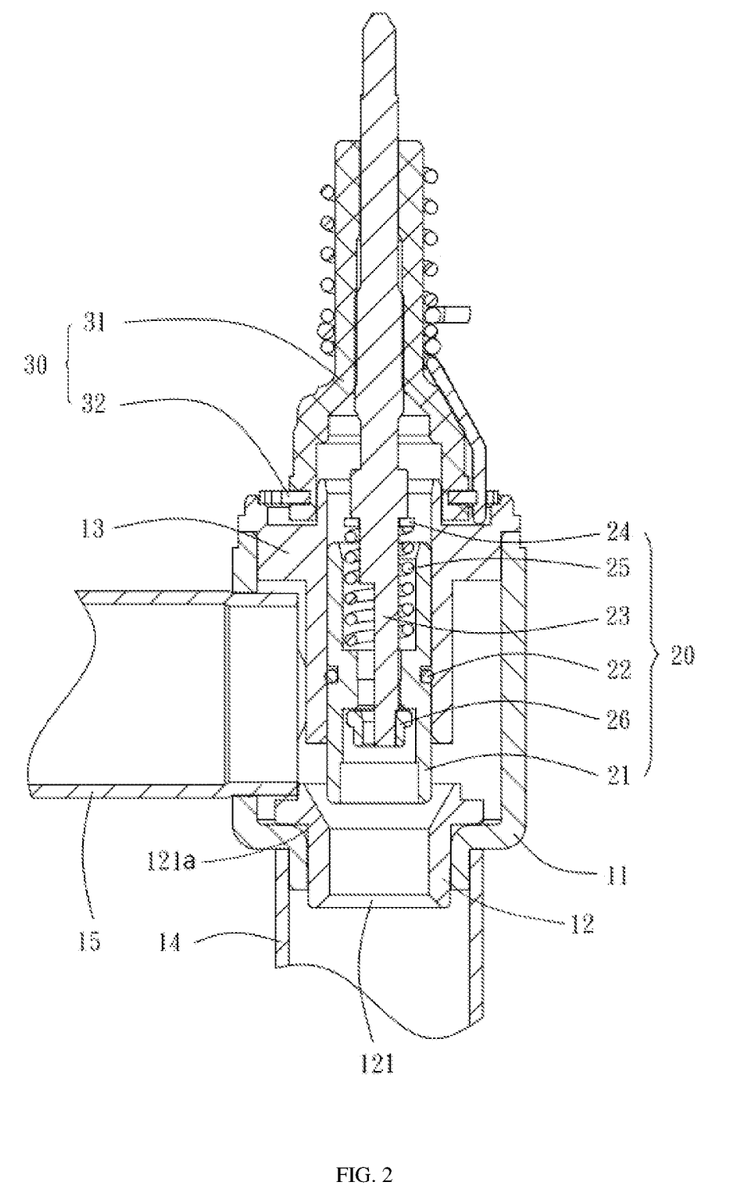
FIG. 2 is a cross-section view of a partial of an electronic expansion valve of the present disclosure.
Figure 3:
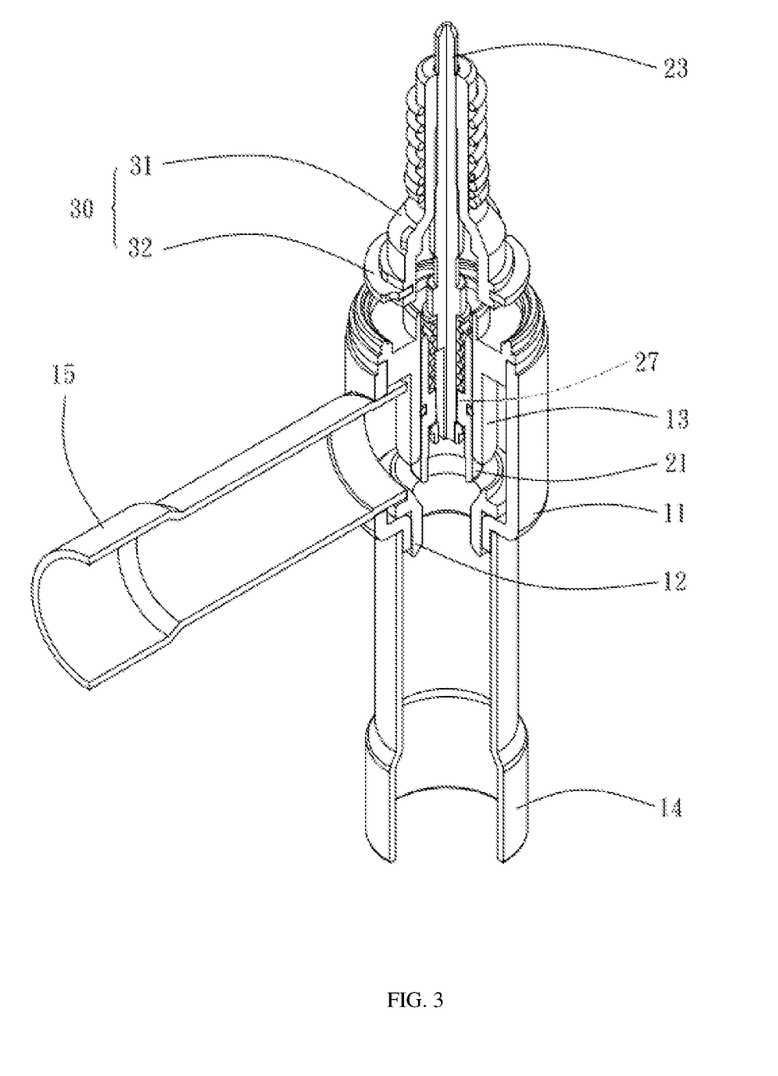
FIG. 3 is a perspective view of the electronic expansion valve shown in FIG. 2 of the present disclosure.

Referring to FIG. 1 to FIG. 3, an electronic expansion valve 100 in one embodiment of the present disclosure can be provided. The electronic expansion valve 100 can be used in an air conditioning system, and be configured for reducing a flow rate and pressure of a refrigerant and adjusting a flow rate of the refrigerant.

Specifically, the electronic expansion valve 100 can include a valve seat assembly 10 and a valve core assembly 20 disposed in the valve seat assembly 10.

The valve seat assembly 10 can include a valve seat 11, a valve seat core 12, and a guide sleeve 13. The valve seat 11 is provided with a valve chamber 11a having an opening at a first end. The valve seat core 12 is disposed on a second end of the valve seat 11, and partly accommodated in the valve chamber 11a. The guide sleeve 13 can be accommodated in the valve chamber 11a and contact the edge of the opening, so as to dispose the guide sleeve 13 on the valve seat 11.

The valve seat core 12 is provided with a through hole 121, which is defined as a valve port. A sidewall of the through hole 121 near the guide sleeve 13 is circumferentially provided with an inclined surface 121a inclined outward. A sealing surface 21a is provided on the end of the valve core assembly 20 matching with the valve seat core 12, and the valve core assembly 20 can move towards or away from the valve seat core 12 to adjust the slot between the inclined surface 121a and the sealing surface 21a, so that the electronic expansion valve can adjust the flow rate of the refrigerant and reduce the flow rate and the pressure of the refrigerant.

An end of the through hole 121 near the guide sleeve 13 is provided with a guiding opening 123. A diameter of the guiding opening 123 gradually increases along a direction from the valve seat core 12 to the guide sleeve 13, so that the inclined surface 121a inclined outward is defined on an inner wall of the guiding opening 123.

Preferably, a cross section of the guiding opening 123 along the direction of an axis of the guiding opening 123 can have an inverted taper shape.

Figure 4:
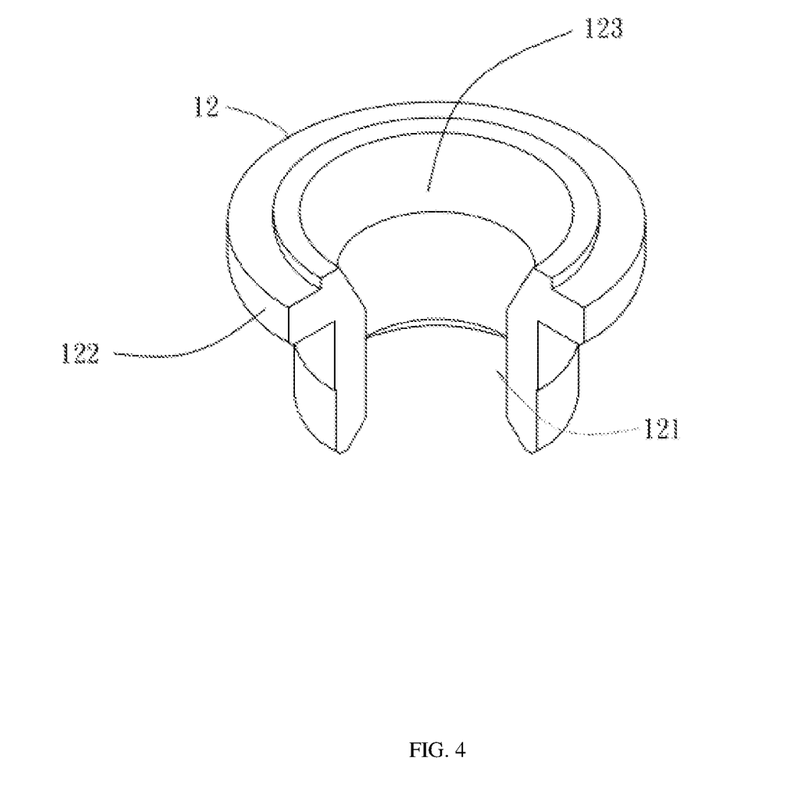
FIG. 4 is a cross-section view of the valve seat core in the electronic expansion valve as shown in FIG. 3 of the present disclosure.
Figure 5:
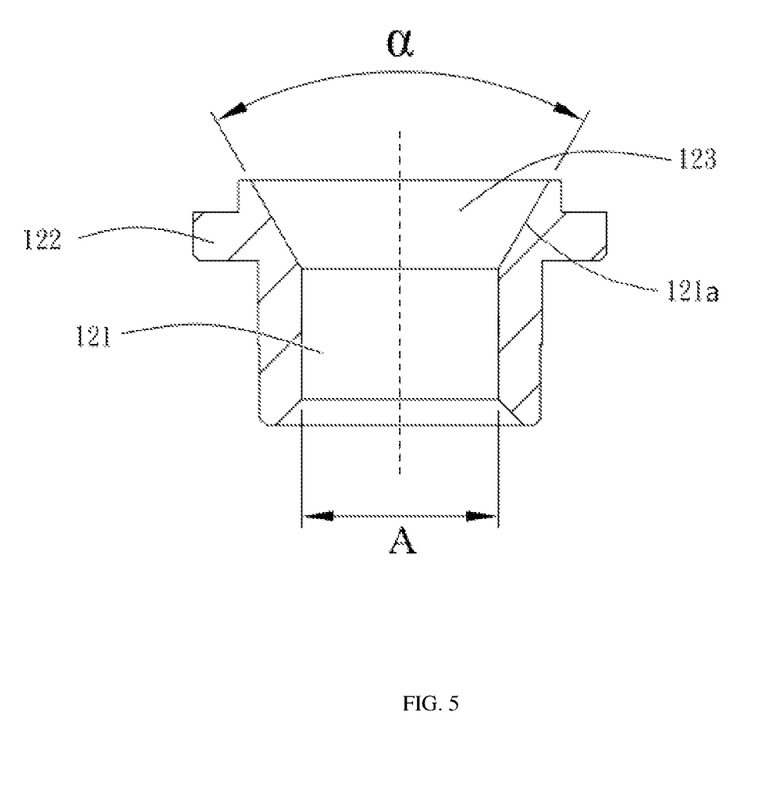
FIG. 5 is a stereoscopic cross-section view of the valve seat core in the electronic expansion valve as shown in FIG. 3 of the present disclosure.

As shown in FIG. 4 and FIG. 5, in one embodiment, along an axial direction of the valve seat core 12, the guiding opening 123 has an open angle $\alpha$, and the end of the through hole 121 away from the guiding opening 123 has a diameter A, and the diameter A increases as the open angle $\alpha$ increases.

It should be noted that in the electronic expansion valve, a flow rate regulation of the electronic expansion valve is defined by the open angle of the guiding opening 123 (i.e., the inclined surface 121a) and the diameter of the through hole 121. The open angle of the guiding opening 123 defines a slope of the flow curve, and the diameter of the through hole 121 defines a maximum value of the flow curve. The flow curve is adjusted by the valve seat cores 12 having a different open angle $\alpha$ and a different diameter A.

It could be understood that, if requiring different flow curves, the open angle of the guiding opening 123 and/or the diameter of the through hole 121 should be adjusted. In a conventional electronic expansion valve, due to an inclined surface and a through hole are arranged on a valve seat core and a valve core assembly, respectively, if realizing five kinds of flow curves, five valve seat cores and five valve core assembly matching with the valve seat cores are required. Thus, not only are the costs of producing and processing expensive, but replacement and assembly are inconvenient. At the same time, every time after the replacement, debugging the mounting error is complicated. At the same time, an inclined surface is provided on the valve core assembly, making the diameter of the valve core assembly larger than the minimum diameter of the guide sleeve. Therefore, the valve core assembly cannot be installed from top to down in the guide sleeve, and the installation is inconvenient.

Correspondingly, in the present disclosure, both the inclined surface 121a and the through hole 121 are arranged on the same valve seat core 12. In use, different flow curves can be obtained as long as changing different valve seat cores 12. The electronic expansion valve not only has good universality, and low production and processing costs, but is also convenient to assemble and has broad application prospect.

In another embodiment, the guiding opening 123 can have an open angle α, the end of the through hole 121 away from the guiding opening 123 has a diameter A. The diameter A is a definite value, which will not change along with the open angle α. That is, the maximum of the flow curve is a definite valve, and flow curves having different slopes are obtained by changing the open angle α.

During processing, different cutting tools are required if processing through holes 121 having different diameters. However, in the present disclosure, the diameter A is the definite value, and only one set of cutting tools is required during the processing. It should be understood that setting a constant diameter A is to save the processing expenditure, when different flow curves can be obtained at the same time.

Furthermore, a protrusion portion 122 can be formed at one end of the valve seat core 12 near the guide sleeve 13. The valve seat 11 is provided with a mounting hole 11b communicating with the valve chamber 11a. The other end of the valve seat core 12 penetrates through the mounting hole 11b, resulting in the protrusion portion 122 abutting against the valve seat 11. That is, the valve chamber 11a abuts against the bottom of the valve camber 11a, thereby mounting the valve seat core 12.

Further, the valve seat 11 is connected with a first channel 14 and a second channel 15 configured for transferring the refrigerant. The first channel 14 sleeves on the valve seat 11 and near the valve seat core 12. The first channel 14 communicates with the through hole 121 of the valve seat core 12. The second channel 15 is arranged on an outer surface of the valve seat 11, and communicates with the valve chamber 11a.

It could be understood that the refrigerant flows into the valve chamber 11a through the second channel 15. The flow rate of the refrigerant can be throttled and adjusted, and the pressure of the refrigerant can be reduced by the through hole 121, and then the refrigerant flows out from the first channel 14. That is, the first channel 14 can communicate with the second channel 15 by opening the through hole 121 and the communication of the first channel 14 and the second channel 15 can be cut off by closing the through hole 121.

Figure 6:
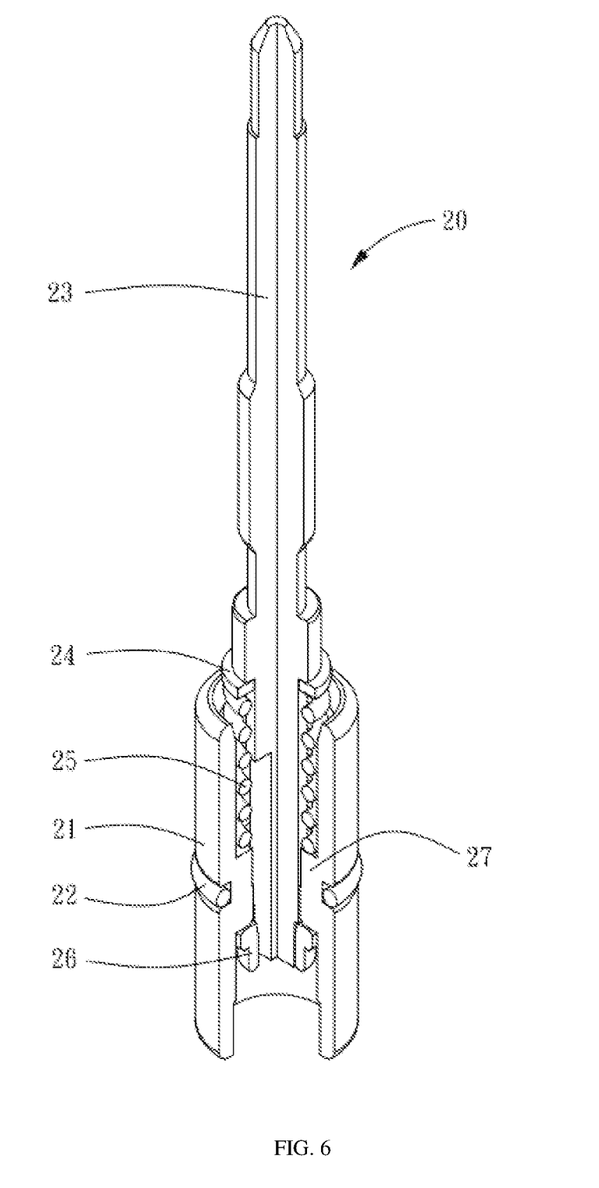
FIG. 6 is a stereoscopic cross-section view of the valve core assembly in the electronic expansion valve as shown in FIG. 5 of the present disclosure.

Referring to FIG. 1 and FIG. 6, the valve core assembly 20 includes a valve head 21, which is disposed and slidable in the guide sleeve 13. One end of the valve head 21 near the valve seat core 12 is provided with a sealing surface 21a. The valve head 21 is driven to move close to or away from the valve seat core 12, so as to adjust a gap between the inclined surface 121a and the sealing surface 21a, thereby adjusting the refrigerant flow rate by the electronic expansion valve 100.

Preferably, the valve head 21 and the valve seat core 12 are coaxially arranged.

Further, the valve core assembly 21 further includes a ball screw 23 and a spring 25. The valve head 21 is provided with a connecting hole 211, and a first end of the ball screw 23 is arranged in the connecting hole 211. The spring 25 sleeves on the ball screw 23, and a first end of the spring 25 abuts against the ball screw 23, and a second end of the spring 25 is accommodated in the connecting hole 211. The ball screw 23 moves and compresses the spring 25, so that the ball screw 23 drives the valve head 21 moving close to the valve seat core 12 under the action of the spring 25.

Preferably, an inner surface of a connecting hole 221 can include a flange 27 protruding inwards, and the ball screw 23 can be provided with a gasket 24. The first end of the spring 25 abuts against the gasket 24, and the second end of the spring 25 abuts against the flange 27, thereby realizing the mounting and limitation of the spring.

Further, the valve core assembly 20 can further include a limiting sleeve 26, which can be accommodated in the connecting hole 211 and matches with the flange 27. The first end of the ball screw 23 penetrates through the flange 27 and is connected with the limiting sleeve 26, thereby preventing the ball screw 23 from dividing from the valve head 21.

Preferably, the gasket 24 and the spring 25 are located at one side of the flange 27 away from the valve seat core 12, and the limiting sleeve 26 is located at the other side of the flange 27 near the valve core seat 12. An outer diameter of the limiting sleeve 26 is larger than an inner diameter of the flange 27, i.e., the limiting sleeve 26 can abut against the flange 27.

It could be understood that when assembling the electronic expansion valve 100, the valve core assembly 20 can be firstly assembled. Due to the valve head 21 and the guide sleeve 13 are separately designed, the valve core assembly 20 penetrates through one end of the guide sleeve 13 to assemble the product. When the product requires replacement, the valve core assembly 20 can be singly disassembled and recycled. Further, the production cost is reduced and the universality of the valve core assembly 20 is improved.

Further, the valve core assembly 20 can further include a sealing ring 22, which is sleeved on an outer surface of the valve head 21, and is configured for sealing the slot between the outer surface of the valve head 21 and the inner surface of the guide sleeve 13.

As shown in FIG. 1, the electronic expansion valve 100 can further include a nut assembly 30 and a rotor 40. The nut assembly 30 is disposed at the first end of the valve seat 11 away from the valve seat core 12; and a second end of the ball screw 23 away from the valve seat core 12 penetrates through the nut assembly 30 and is threadedly connected to the nut assembly 30. The ball screw 23 is connected to the rotor 40 and driven by the rotor 40 to rotate. The threaded connection of the nut assembly 30 of the ball screw 23 can transform a rotating motion of the ball screw 23 to a linear motion of the ball screw 23, so that the ball screw 23 can drive the valve head 21 to move close to or away from the valve seat core 12, turning on or turning off the electronic expansion valve 100.

Specifically, the nut assembly 30 can include a nut seat 31 and a fixing plate 32. The fixing plate 32 is in a ring shape. An inner surface of the fixing plate 32 contacts the nut seat 31, resulting in the fixing plate 32 connecting with the nut seat 31. The outer surface of the fixing plate 32 contacts one end of the guide sleeve 13, resulting in the fixing plate 32 connecting with the end of the guide sleeve 13. Therefore, the nut assembly 30 is arranged and limited. The rotor 40 is located at an end of the nut assembly 31 away from the guide sleeve 13, and is fixedly connected with the ball screw 23.

Referring to FIG. 1, the electronic expansion valve 100 can further include a sleeve tube 50. One end of the sleeve tube 50 is connected with the guide sleeve 13, and the sleeve tube 50 is configured for accommodating the nut assembly 30 and the rotor 40, so as to protect the rotor 40 and the nut assembly 30 by the sleeve tube 50.

Preferably, the sleeve tube 50 is connected to the guide sleeve 13 by welding.

The advantages of the electronic expansion valve in the present disclosure areas following.

Firstly, the valve seat core 12 has the inclined surface 121a, i.e., the valve seat core 12 has both the through hole 121 and the inclined surface 121a together. When applied in different conditions, as long as the valve seat core 12 is changed, a slot between the sealing surface 21a of the valve head 21 and the inclined surface 121a of the valve seat core 12 can be controlled and the flow curve is adjusted. The electronic expansion valve not only has good universality and low producing and processing cost, but also has a promising application. In addition, the valve head 21 and the guide sleeve 13 are arranged, independently, i.e., the valve head 21 and the guide sleeve 13 are separately from each other. When assembling the electronic expansion valve 100, the valve core assembly 20 can be firstly assembled. Due to the valve head 21 and the guide sleeve 13 are separately designed, the valve core assembly 20 penetrates through one end of the guide sleeve 13 to assemble the finished product. When the product requires replacement, the valve core assembly 20 can be independently disassembled and recycled, thereby further effectively reducing the product cost.

The technical features of the above-described embodiments may be combined in any combination. For the sake of brevity of description, all possible combinations of the technical features in the above embodiments are not described. However, as long as there is no contradiction between the combinations of these technical features, all should be considered as the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An electronic expansion valve, comprising a valve seat assembly and a valve core assembly disposed in the valve seat assembly; wherein the valve seat assembly comprises a valve seat, a valve seat core, and a guide sleeve; the valve seat is provided with a valve chamber having an opening at a first end, and the valve seat core is disposed on a second end of the valve seat, and the guide sleeve is disposed on the valve seat;

the valve seat core is provided with a through hole; a sidewall of the through hole near the guide sleeve is circumferentially provided with an inclined surface inclined outwards and configured for controlling a flow rate of a refrigerant; and the valve core assembly comprises a valve head, which is disposed in the guide sleeve, and is slidable; one end of the valve head matching with the valve seat core is provided with a sealing surface;

the valve head is driven to move close to or away from the valve seat core, so as to adjust a gap between the inclined surface and the sealing surface and control the flow rate of the refrigerant;

wherein the valve core assembly further comprises a ball screw and a spring; the valve head is provided with a connecting hole, and a first end of the ball screw is arranged in the connecting hole; and the spring sleeves on the ball screw, and a first end of the spring abuts against the ball screw, and a second end of the spring is located in the connecting hole, an inner surface of the connecting hole has a flange protruding inwards, and the second end of the spring abuts against the flange.

2. The electronic expansion valve of claim 1, wherein an end of the through hole near the guide sleeve is provided with a guiding opening; a diameter of the guiding opening gradually increases along a direction from the valve seat core to the guide sleeve, so that the inclined surface inclined outwards is defined on an inner wall of the guiding opening.

3. The electronic expansion valve of claim 1, wherein the guiding opening has an open angle $\alpha$, and the through hole has a diameter A, and the diameter A increases as the open angle $\alpha$ increases.

4. The electronic expansion valve of claim 1, wherein a protrusion portion is formed at one end of the valve seat core near the guide sleeve; the valve seat is provided with a mounting hole communicating with the valve chamber; and the other end of the valve seat core penetrates through the mounting hole, resulting in the protrusion portion abutting against the valve seat.

5. The electronic expansion valve of claim 1, wherein the ball screw is provided with a gasket and the first end of the spring abuts against the gasket.

6. The electronic expansion valve of claim 5, wherein the valve core assembly further comprises a limiting sleeve, which is accommodated in the connecting hole and matches with the flange to limit the valve seat core; and the first end of the ball screw penetrates through the flange and is connected with the limiting sleeve.

7. The electronic expansion valve of claim 6, wherein the gasket and the spring is located at one side of the flange, and the limiting sleeve is located at the other side of the flange; and an outer diameter of the limiting sleeve is larger than an inner diameter of the flange.

8. The electronic expansion valve of claim 1, wherein the valve core assembly further comprises a sealing ring, which is sleeved on an outer surface of the valve head, and is configured for sealing a slot between the outer surface of the valve head and an inner surface of the guide sleeve.

9. The electronic expansion valve of claim 1, wherein the electronic expansion valve further comprises a nut assembly and a rotor; the nut assembly is disposed at the first end of the valve seat away from the valve seat core; and a second end of the ball screw away from the valve seat core penetrates from and screws to the nut assembly, and is connected to the rotor.

10. The electronic expansion valve of claim 9, wherein the nut assembly comprises a nut seat and a fixing plate; the fixing plate is in a ring shape; and an inner surface of the fixing plate contacts the nut seat, resulting in the fixing plate being connected with the nut seat, and the outer surface of the fixing plate contacts one end of the guide sleeve, resulting in the fixing plate being connected with the end of the guide sleeve.

11. The electronic expansion valve of claim 9, wherein the electronic expansion valve further comprises a sleeve tube; and one end of the sleeve tube is connected with the guide sleeve, and the sleeve tube is configured for accommodating the nut assembly and the rotor.

* * * * *